May 5, 1925.  1,536,365

C. M. WISEMAN

COMBINED RING AND READING GLASS

Filed Dec. 30, 1922

Inventor
Carl M. Wiseman

By Shepherd Campbell
Attorneys

Patented May 5, 1925.

1,536,365

UNITED STATES PATENT OFFICE.

CARL M. WISEMAN, OF LOUISVILLE, KENTUCKY.

COMBINED RING AND READING GLASS.

Application filed December 30, 1922. Serial No. 609,880.

*To all whom it may concern:*

Be it known that I, CARL M. WISEMAN, citizen of United States, residing at 116 W. Kentucky Street, Louisville, in the county of Jefferson and State of Kentucky, have invented certain new and useful Improvements in Combined Rings and Reading Glasses, of which the following is a specification, reference being had therein to the accompanying drawings.

This invention relates to a combined finger ring and magnifying glass, the glass being attached to the ring in such manner that it may be folded over upon the top of the ring to occupy much the position of a set, when not in use, or may be swung to a position substantially at right angles to the first named position, when it is desired to use the same.

Further objects and advantages of the invention may be set forth in the detailed description which follows.

In the accompanying drawing.

Like numerals designate corresponding parts throughout the several figures of the drawing.

Figure 1:
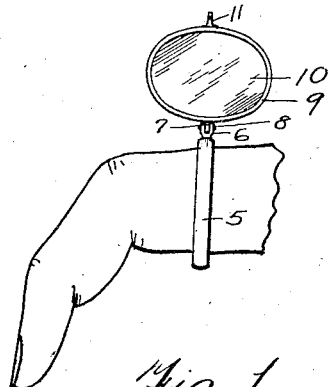
Fig. 1 shows a view of the combined ring and glass with the glass swung out to operative position.
Figure 2:
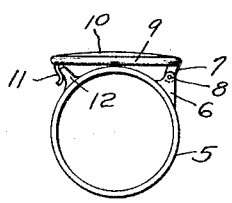
Fig. 2 is a view showing the glass folded down to closed position.

In the preferred form of the invention, viz, in the form illustrated in Figs. 1 and 2, 5 designates a finger ring which is of usual construction except that it is provided with ears or extensions 6 in which an arm 7 is pivoted at 8. This arm carries a metallic frame 9, preferably of oval formation, though not necessarily of such shape, and this frame, in turn, supports a magnifying glass or lens 10. At its edge opposite the arm 7, the frame 9 is provided with a snap 11 which is adapted to engage a projection 12 that is carried by the ring 5 and which snap holds the magnifying glass in the position illustrated in Fig. 2 until it is desired to use the same at which time the glass may, by disengaging the snap 11, be swung to a position substantially at right angles to that illustrated in Fig. 2 or, in other words to the position illustrated in Fig. 1. The ring being worn either upon the little finger or the finger next thereto, as desired, the glass is thus brought into position to enable a person whose eye sight is not good to utilize the same as a reading glass by moving the hand slowly along a printed page. When the oval frame and glass 10 are folded down in the position illustrated in Fig. 2, the structure presents a pleasing and ornamental appearance in that the oval frame, which may be of gold and the highly polished lens 10 has much the appearance of a set lying over the top of the finger in the position usually occupied by the set of a ring. If desired, I may further enhance this suggestion of a set by applying to the ring a structure such as that illustrated in Figs. 3 and 4. In this case a plate 14 is soldered or otherwise secured to the ring and this plate may support a surface 15 cut or otherwise shaped to imitate a set and this surface may be suitably colored. If, for example, it is desired to imitate a ruby, the surface 15 will be of a dark red color. If it is desired to imitate an emerald this surface will be given a green color of the proper shade. When the glass 10ᵃ is closed down over this imitation surface 15, the highly polished effect produced by the glass in combination with the colors and configurations produced by the surface 15 will make an article of jewelry of very attractive appearance. At the same time the glass may be swung to the position illustrated in Fig. 1 and utilized as a reading glass, because at the time that it is being used it is at right angles to the surface 15 and the presence of this surface would in no wise interfere with the use of the reading glass for the purpose stated.

Figure 3:
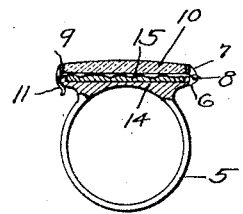
Fig. 3 is a view substantially like Fig. 2 but illustrating a modified form of the device.
Figure 4:
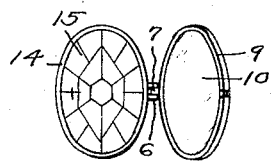
Fig. 4 is a plan view of the device shown in Fig. 3 with the glass swung to open or operative position.

I may or may not use the structure of Figs. 3 and 4, the invention residing, broadly, in the combination of the ring and glass combined as described, irrespective of whether a backing surface 15 is employed in conjunction therewith, or not.

Having described my invention, what I claim is:

In combination a ring, a plate carried thereby forming an enlargement at one side of the ring, a backing surface made in imitation of a cut stone secured to said plate, a reading glass comprising a lens hinged to said plate to be folded down thereover so that the surface in imitation of a cut stone may be viewed through the lens of the reading glass and said lens being of such a nature as to magnify when the user looks from that side of the lens which is toward the plate when the reading glass is in closed position said lens being of such area as to permit of its use as a reading glass.

In testimony whereof I hereunto affix my signature.

CARL M. WISEMAN.